United States Patent

LaCome

[11] Patent Number: 6,036,202
[45] Date of Patent: Mar. 14, 2000

[54] SIT-SKI

[76] Inventor: Kenneth Paul LaCome, P.O. Box 1026, Questa, N. Mex. 87556

[21] Appl. No.: 08/982,751

[22] Filed: Dec. 2, 1997

[51] Int. Cl.[7] ....................................................... B62B 9/04
[52] U.S. Cl. .......................................... 280/28.14; 280/25
[58] Field of Search ................................ 280/28.14, 845, 280/14.1, 18, 28.15, 28.16, 15, 16, 21.1, 28, 14.2

[56] References Cited

U.S. PATENT DOCUMENTS

| | | | |
|---|---|---|---|
| 3,325,179 | 6/1967 | Bissett | 280/25 |
| 3,588,138 | 6/1971 | Cerny | 280/16 |
| 3,917,301 | 11/1975 | Fabris | 280/28.14 |
| 4,193,609 | 3/1980 | Bissett | 280/28.14 |
| 4,260,036 | 4/1981 | Bissett | 180/182 |
| 4,632,408 | 12/1986 | Olpp et al. | 280/28.14 |

*Primary Examiner*—J. J. Swann
*Assistant Examiner*—David R. Dunn
*Attorney, Agent, or Firm*—Nydegger & Associates

[57] ABSTRACT

A sit-ski includes a ski and a base frame which is mounted on the ski. A seat support is pivotally mounted on the base frame for rotation about an axis that is above the ski and substantially perpendicular to the axis of the ski. This allows the seat to move on an arcuate path about the axis of rotation. A shock absorber has one end which is connected to the seat support between the seat and the axis of rotation, and another end which is attached to the base frame. Accordingly, movement of the seat on its path causes compression or elongation of the shock absorber. The ratio for movement of the seat, relative to compression of the shock absorber is approximately 3.5:1.

12 Claims, 2 Drawing Sheets

SIT-SKI

FIELD OF THE INVENTION

The present invention pertains generally to snow skiing equipment. More particularly, the present invention pertains to the suspension system for a sit-ski. The present invention is particularly, but not exclusively, useful for improving the performance and control of a single ski as the skier sits on the ski.

BACKGROUND OF THE INVENTION

As winter sports, and particularly the sports of skiing and snowboarding, have increased in popularity, it is not surprising that many new and innovative improvements have been developed for the clothing and equipment that must be used. In addition to improvements of existing equipment, there have also been many significant developments in new types of equipment. Of particular importance for the present invention is the sit-ski which allows a person to ski in snow while maintaining a sitting position.

For the sitting skier, the suspension and support system which is used to attach and hold the ski on the skier is a structure of major importance. Through such structure, the skier must be able to control the ski at all times. Obviously, control is required as the sit-ski is maneuvered down the slope of a mountain. Importantly, this control must be maintainable over a wide range of speeds across a variety of different terrain features. Furthermore, and not so obviously, the sit-ski needs to be controlled at the equally challenging times when the skier and his/her equipment need to get on and off a chair lift.

One feature of special importance to the design of any sit-ski is the skiers reaction as the ski is being maneuvered down a slope. Heretofore, suspension systems for sit-skis have been generally constructed as parallelograms with one side of the parallelogram being attached to the ski and the opposite side being used as a support platform for the skier. Such a construction essentially maintains the skier's support platform in an orientation that is parallel to the ski. When appropriate, shock absorbers are added to dampen movements of the support platform, however, the consequence has been that vertical movement for the skier becomes significantly limited. On the other hand, it is recognized by the present invention that some additional vertical movement, over what is currently available, facilitates control of a sit ski. Furthermore, it is recognized that some additional vertical movement provides more comfort and freedom of operation for the skier.

In light of the above it is an object of the present invention to provide a sit-ski which has improved comfort and controllability. It is another object of the present invention to provide a sit-ski which establishes a relatively low center of gravity for improved control. Still another object of the present invention is to provide a sit-ski which minimizes chatter. Another object of the present invention is to provide a sit-ski which is simple to use, relatively easy to manufacture, and comparatively cost effective.

SUMMARY OF THE PREFERRED EMBODIMENTS

A sit-ski in accordance with the present invention includes a ski and a base frame which is mounted onto the ski. A seat support, which has a first end and a second end, has its first end hingedly mounted on the base frame for rotation of the seat support about a first axis. This first axis is distanced from, and is substantially perpendicular to, the longitudinal axis of the ski. A seat for the skier is attached to the second end of the seat support so that the seat will travel on a substantially arcuate path around the first axis.

A shock absorber has a first end and a second end and it compresses with relative movement of its ends through a compression distance. The first end of this shock absorber is hingedly connected to the seat support at a point that is intermediate the first axis (first end of seat support) and the seat (second end of seat support). The second end of the shock absorber is then hingedly attached to the base frame at a point near the ski itself. More specifically, the shock absorber is positioned and connected as stated above, to establish a ration between the arcuate path movement of the seat and the corresponding compression distance of the shock absorber that is greater than approximately two to one (2:1).

In greater detail, the structure for connecting the shock absorber to the seat support includes a pair of stabilizer links which are pivotally attached to the base frame. Specifically, these stabilizer links are each attached to the base frame for a respective rotation about a second axis. This second axis is substantially parallel to the first axis and slightly distanced therefrom. Additionally, there is a bell crank which has a first end and a second end with a fulcrum between these ends. The second ends of the stabilizer links are then each hingedly attached to the fulcrum of the bell crank, while the first end of the bell crank is hingedly attached to the first end of the shock absorber, and the second end of the bell crank is hingedly attached to the seat support.

The structure for mounting the base frame onto the ski includes a first bracket and a second bracket which are each fixedly attached to the ski. The base frame, which has a heel and a toe, has its toe hingedly mounted directly onto the first bracket. There is also a de-camber link which has one end hingedly attached to the second bracket and its other end hingedly attached to the heel of the base frame to allow for appropriate de-flexing of the ski.

For the comfort and convenience of the skier the sit-ski also includes an extension bar which is mounted on the base frame to extend from the base frame toward the tip end of the ski. Additionally, there is a foot rest which is adjustably mounted on the extension arm to be selectively positioned as desired by the skier.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENT

Figure 1:
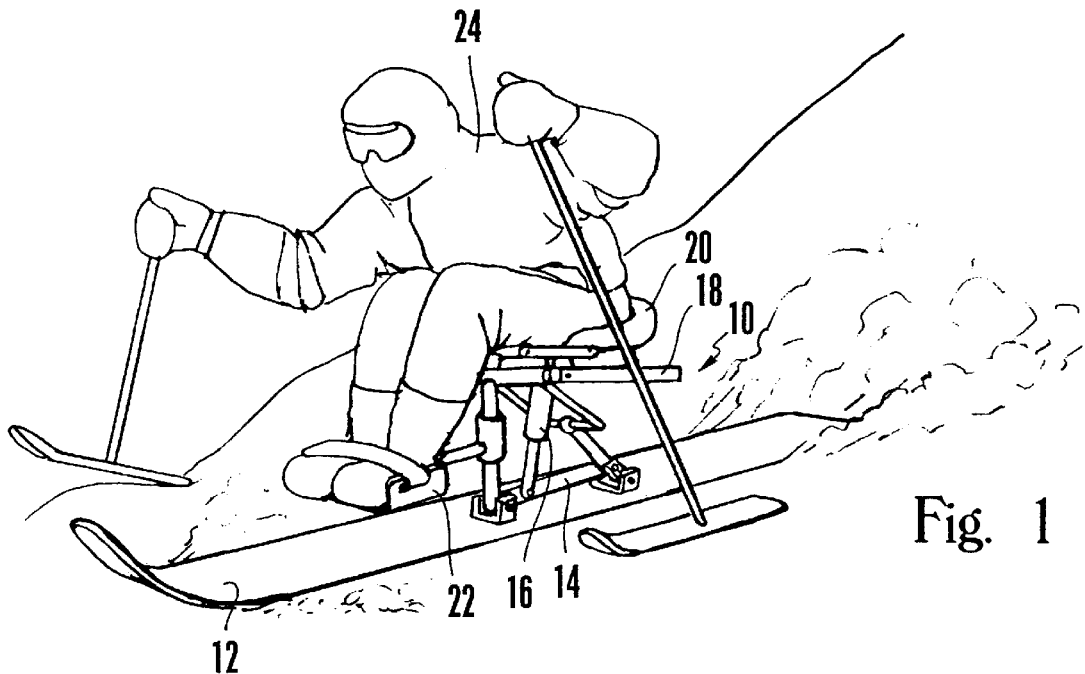
FIG. 1 is a perspective view of a skier using the sit-ski of the present invention.

Referring initially to FIG. 1, a sit-ski in accordance with the present invention is shown and generally designated 10. More specifically, as shown, the sit-ski 10 includes a ski 12, a base frame 14 which is mounted onto the ski 12, a shock absorber 16 and a seat support 18 which interacts with both the base frame 14 and the shock absorber 16. Further, the sit-ski 10 includes a seat 20 and a foot rest 22 for use by the skier 24 as he/she maneuvers the sit-ski 10 down the snow-covered slope of a mountain.

For the purposes of the present invention, the ski 12 can be any conventional type of ski that is commercially available. There are no specific modifications which need to be done for the ski itself and the specific selection of a ski 12 is a matter of choice for the skier 24. Further, the shock absorber 16 may be of any commercially available type well known to the skilled artisan. The selection of the shock absorber 16, however, will depend to some extent on the desired stiffness, recovery characteristics and travel range of the shock absorber 16 as it compresses and extends. For the present invention, the amount by which the shock absorber 16 shortens during any particular compression, and subsequent expansion, will be generally referred to as the "compression distance" of the shock absorber 16. Typically, this compression distance will be only approximately 2 or 4 inches in response to design impact loads that are expected on the shock absorber 16 during maneuver of the sit-ski 10. The actual construction of the suspension system for the sit-ski 10 will be best appreciated by cross referencing both FIGS. 2 and 3.

Figure 2:
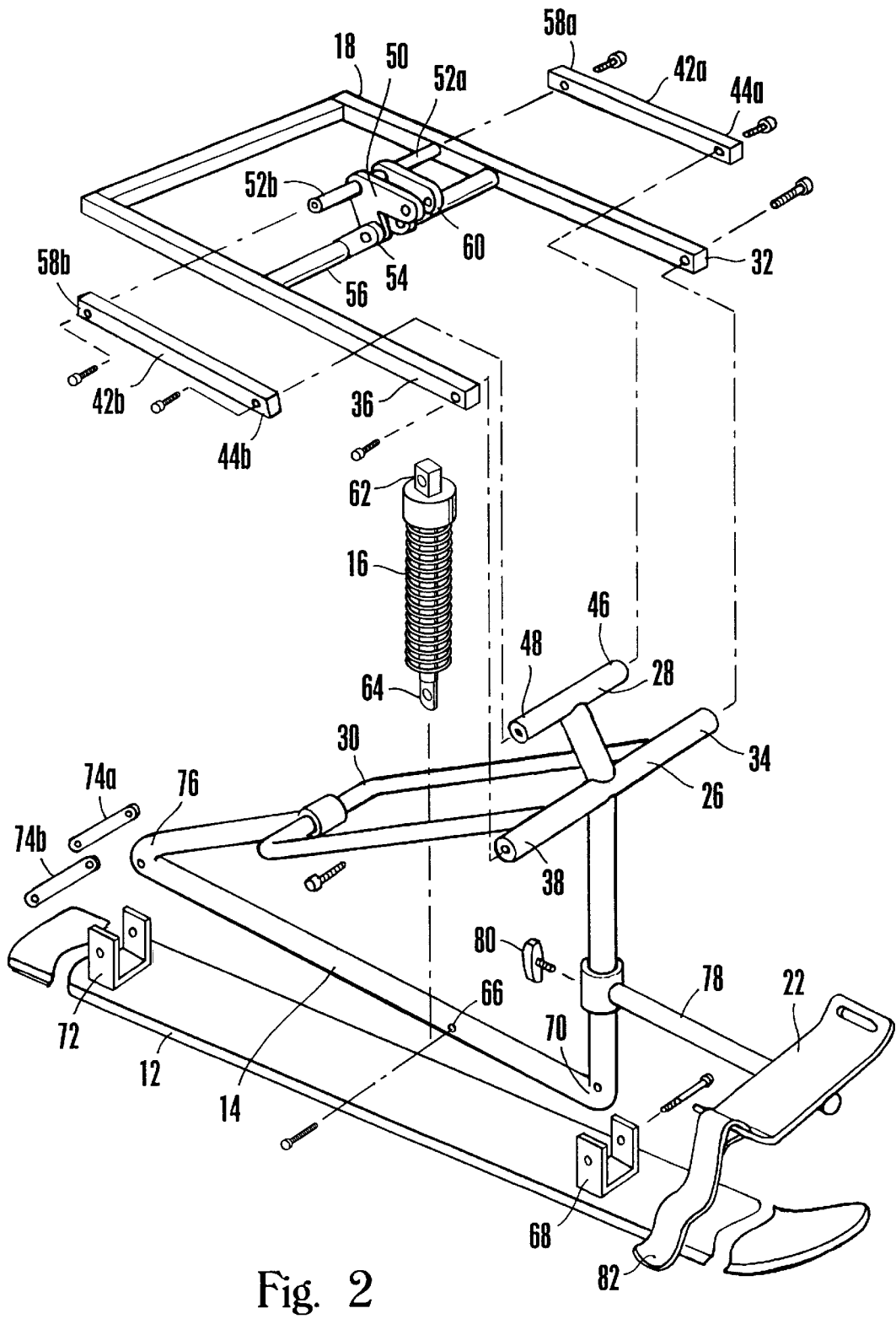
FIG. 2 is an exploded perspective view of the suspension system for the sit-ski of the present invention.

In FIG. 2 it will be seen that the base frame 14 is formed with a horizontal bar 26 (establishes a first axis) and a horizontal bar 28 (establishes a second axis). As shown, the first axis of bar 26 and the second axis of bar 28 are substantially mutually parallel to each other, and both are substantially perpendicular to the longitudinal axis of the ski 12. It is also shown that a U-shaped component 30 extends from the horizontal bar 26 to continue the closed integrity of the base frame 14. Further, as indicated in FIG. 2, the seat support 18 has an end 32 which is hingedly or pivotally attached to the end 34 of bar 26 by any means well known in the art, such as with pivot pins. Likewise, the end 36 of seat support 18 is hingedly or pivotally attached to the end 38 of bar 26. With this attachment, the seat support 18 is rotatable around the first axis established by the bar 26 to move the seat 20 up and down on a substantially arcuate path indicated by the arrows 40 in FIG. 3.

It is also shown in FIG. 2 that the suspension system of the sit-ski 10 includes a pair of stabilizer bars 42a and 42b. These stabilizer bars 42a,b have a respective end 44a,b which is hingedly or pivotally attached to the horizontal bar 28 in a manner well known in the art, such as pivot pins. Specifically, the end 44a of stabilizer bar 42a is attached to the end 46 of horizontal bar 28, and the end 44b of stabilizer bar 42b is attached to the end 48 of the horizontal bar 28. With this attachment, both of the stabilizer bars 42a,b are able to rotate around the second axis established by the horizontal bar 28.

A bell crank 50 is provided which has a pair of pins 52a and 52b that extend in opposite direction from the fulcrum of the bell crank 50 substantially as shown in FIG. 2. Also, the bell crank has an end 54 which is pivotally connected to a cross bar 56 which, as shown, is integral with the seat support 18. Thus, the bell crank 50 is able to rotate on the seat support 18. Further, the fulcrum pins 52a and 52b of the bell crank 50 are pivotally connected respectively to the end 58a of stabilizer bar 42a and to the end 58b of the stabilizer bar 42b. This leaves the end 60 of bell crank 50 free for its connection with the shock absorber 16.

Figure 3:
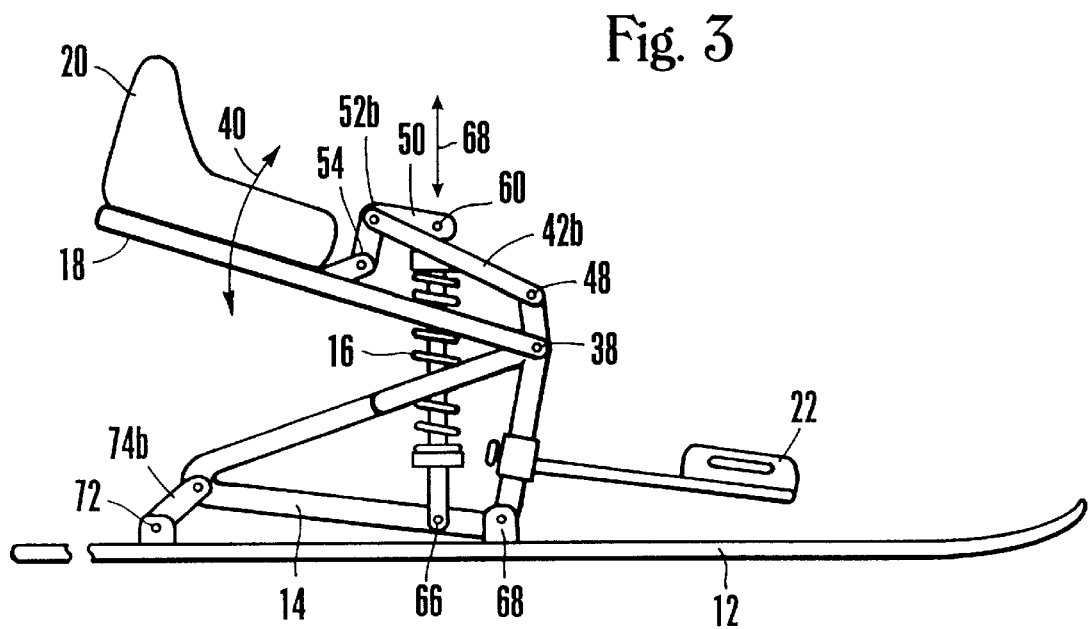
FIG. 3 is a side elevation view of the sit-ski with its suspension system assembled.

As shown in both FIGS. 2 and 3, the end 60 of bell crank 50 is pivotally attached to the end 62 of shock absorber 16.

Also, the end 64 of shock absorber 16 is pivotally attached to the base frame 14 at the point 66. With this connection, any rotation of the seat support 18 (in the directions of arrows 40 in FIG. 3) will be accompanied by a corresponding compression or elongation of the shock absorber 16 (in the directions of arrows 68 in FIG. 3). As intended for the present invention, the locations of attachment for the ends 62 and 64 of the shock absorber 16 will be selected so that the ratio between movement of the seat 20 along its arcuate path of travel (arrows 40) and the compression distance of shock absorber 16 (arrows 68) will be around 3.5:1 or 4:1.

The mounting of the base frame 14 to the ski 12 is accomplished by fixedly attaching a bracket 68 to the ski 12. The toe 70 of the base frame 14 can then be pivotally attached to the bracket 68. Additionally, a bracket 72 is fixedly attached to the ski 12. In order to maintain the flexibility of the ski 12 during operation of the sit-ski 10, a pair of de-camber links 74a and 74b are pivotally attached to the bracket 72 and correspondingly attached to the heel 76 of the base frame 14. With this connection, the portion of ski 12 which is between the brackets 68 and 72 can de-flex to the extent designed for the ski 12.

FIG. 2 also shows that the sit-ski 10 of the present invention is provided with an adjustable foot rest 22. Specifically, an extension bar 78 is slidably attached to the base frame 14. The exact position of the extension bar 78 is established by manipulation of the adjustment knob 80 which allows the raising and lowering of the foot rest 22 relative to the ski 12. Additionally, the foot rest 22 can be moved forward and backward on the extension bar 78 as desired. Finally, a strap 82 is provided to securely hold the feet of the skier 24 on the foot rest 22 during operation of the sit-ski 12.

While the particular sit-ski as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A sit-ski which comprises:

a ski having a tip end and a back end;

a base frame mounted on said ski;

a seat support pivotally mounted on said base frame for rotation about a first axis, said first axis being substantially perpendicular to said ski;

a shock absorber having a first end attached to said seat support for movement therewith and a second end hingedly attached to said base frame for compression of said shock absorber as said seat support rotates about said first axis toward said ski;

a stabilizer link having a first end and a second end, with said first end pivotally attached to said base frame for rotation about a second axis, said second axis being substantially parallel to said first axis; and a bell crank having a first end and a second end with a fulcrum therebetween, said second end of said stabilizer link being hingedly attached to said fulcrum of said bell crank with said first end of said bell crank hingedly attached to said first end of said shock absorber and said second end of said bell crank hingedly attached to said seat support.

2. A sit-ski as recited in claim 1 further comprising a seat mounted on said seat support with said first end of said shock absorber attached to said seat support between said seat and said first axis.

3. A sit-ski as recited in claim 1 wherein said base frame has a toe and a heel and said sit-ski further comprises:

a first bracket fixedly attached to said ski with said toe of said base hingedly mounted thereto;

a second bracket fixedly attached to said ski; and a de-camber link having an end hingedly attached to said second bracket and another end hingedly attached to said heel of said base frame.

4. A sit-ski as recited in claim 1 further comprising:

an extension bar mounted on said base frame to extend from said base frame toward said tip end of said ski; and a foot rest adjustably mounted on said extension bar to be selectively positioned thereon.

5. A sit-ski which comprises:

a ski;

a base frame mounted on said ski;

a seat support having a first end and a second end, said first end of said seat support being pivotally mounted at a first stationary point on said base frame at a predetermined distance from said ski for movement of said second end of said seat support toward and away from said ski in rotation through an arc distance about a first axis along a substantially arcuate path around said first axis a stabilizer link having a first end and a second end, with said first end pivotally attached to said base frame for rotation about a second axis, said second axis being substantially parallel to said first axis; and a shock absorber having a first end and a second end with a relative movement therebetween through a compression distance, said first end of said shock absorber being hingedly attached to said seat support between said first and second ends thereof, and said second end of said shock absorber being hingedly attached at a second stationary point on said base frame to establish a ratio between said arc distance movement of said second end of said seat support and a corresponding portion of said compression distance for said shock absorber, and wherein said ratio is greater than approximately two to one (2:1).

6. A sit-ski as recited in claim 5 wherein arcuate path movement of said second end of said seat support through said arc distance is greater than approximately four inches.

7. A sit-ski as recited in claim 5 further comprising a seat mounted on said second end of said seat support.

8. A sit-ski as recited in claim 5 further comprising:

a bell crank having a first end and a second end with a fulcrum therebetween, said second end of said stabilizer link being hingedly attached to said fulcrum of said bell crank with said first end of said bell crank hingedly attached to said first end of said shock absorber and said second end of said bell crank hingedly attached to said seat support.

9. A sit-ski as recited in claim 8 wherein said base frame has a toe and a heel and said sit-ski further comprises:

a first bracket fixedly attached to said ski with said toe of said base hingedly mounted thereto;

a second bracket fixedly attached to said ski; and a de-camber link having an end hingedly attached to said second bracket and another end hingedly attached to said heel of said base frame.

10. A sit-ski as recited in claim 9 further comprising:

an extension bar mounted on said base frame to extend from said base frame toward said tip end of said ski; and a foot rest adjustably mounted on said extension bar to be selectively positioned thereon.

11. A sit-ski which comprises:

a ski;

a base frame mounted on said ski;

a seat support having a first end and a second end, said first end of said seat support being pivotally mounted at a first stationary point on said base frame at a predetermined distance from said ski for movement of said second end of said seat support toward and away from said ski in rotation through an arc distance about a first axis along a substantially arcuate path around said first axis;

a bell crank having a first end and a second end with a fulcrum therebetween, with said first end of said bell crank hingedly attached to said first end of said shock absorber and said second end of said bell crank hingedly attached to said seat support; and a shock absorber having a first end and a second end with a relative movement therebetween through a compression distance, said first end of said shock absorber being hingedly attached to said seat support between said first and second ends thereof, and said second end of said shock absorber being hingedly attached at a second stationary point on said base frame to establish a ratio between said arc distance movement of said second end of said seat support and a corresponding portion of said compression distance for said shock absorber, and wherein said ratio is greater than approximately two to one (2:1).

12. A sit-ski as recited in claim 11 further comprising:

a stabilizer link having a first end and a second end, with said first end pivotally attached to said base frame for rotation about a second axis, said second axis being substantially parallel to said first axis, said second end of said stabilizer link being hingedly attached to said fulcrum of said bell crank.

* * * * *